May 20, 1924.

M. A. BOYLAN

TIRE PROTECTOR

Filed Dec. 14, 1922

1,494,337

Inventor
Michael A. Boylan.
By Philip A. H. Senell
Attorney

Patented May 20, 1924.

1,494,337

UNITED STATES PATENT OFFICE.

MICHAEL A. BOYLAN, OF OMAHA, NEBRASKA, ASSIGNOR TO BOYLAN TIRE & RUBBER COMPANY, OF OMAHA, NEBRASKA.

TIRE PROTECTOR.

Application filed December 14, 1922. Serial No. 606,832.

*To all whom it may concern:*

Be it known that MICHAEL A. BOYLAN, citizen of the United States, residing at Omaha, in the county of Douglas and State of Nebraska, has invented certain new and useful Improvements in Tire Protectors, of which the following is a specification, reference being had therein to the accompanying drawings.

The invention relates to tire protector, and has for its object to provide a device of this character preferably formed from an old tire casing having its clincher flanges cut off and adapted to engage over a new tire casing and held thereon when the tire is inflated.

A further object is to provide segmentally shaped members adapted to pass to loops of the tire protector, one of the adjacent ends of which loops are provided with detachable interengaged portions, and the other ends of the members with hooks adapted to hook through apertures in plates carried by the tire protector, thereby limiting the expansion of the protector.

A further object is to provide the tire protector with transversely disposed incisions, which incisions, when the tire protector is expanded by the inflation of the tire, open, thereby forming means for gripping the ground and preventing spinning of the wheel and reducing the danger of skidding to a minimum.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 2:
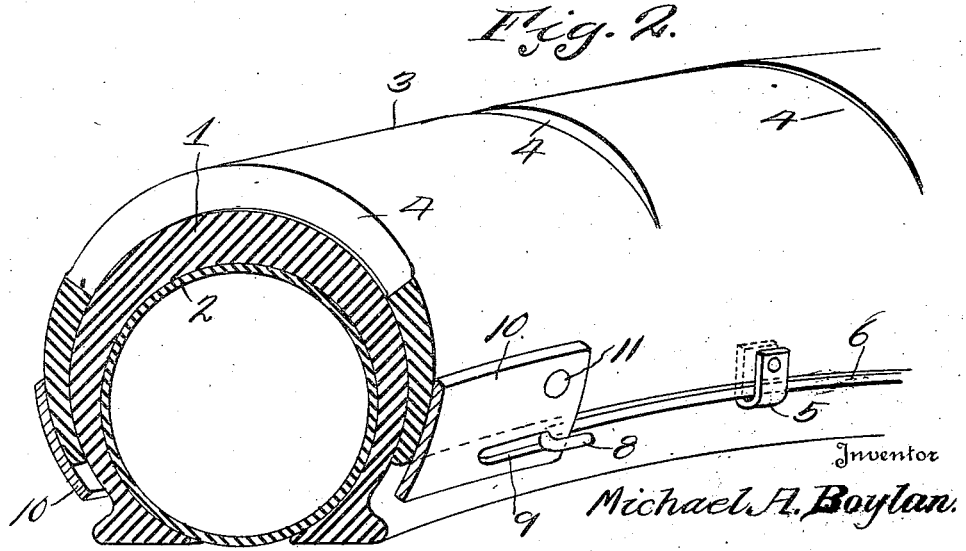
Figure 2 is a perspective view of a portion of the tire, showing a portion of the tire protector.

Referring to the drawing, the numeral 1 designates the casing of a conventional form of pneumatic tire, and 2 the inner tube disposed therein, which, when inflated, prevents collapse of the casing 1. The tire protector comprises an annular member 3, which member is preferably formed from an old tire casing having its clincher flanges cutaway and is placed on the tire casing 1 when the same is deflated. After the annular member 3 has been placed on the tire casing 1, the inner tube 2 is inflated in the usual manner, thereby securely binding the annular member on the tire casing and preventing circumferential displacement or movement of the same. The annular member 3 is provided with transversely disposed slits 4, which slits, when the inner tube 2 is inflated, are stretched open as shown in Figure 2, thereby forming gripping means for engaging the ground and preventing spinning of the wheel in the mud and reducing the danger of skidding to a minimum.

Figure 1:
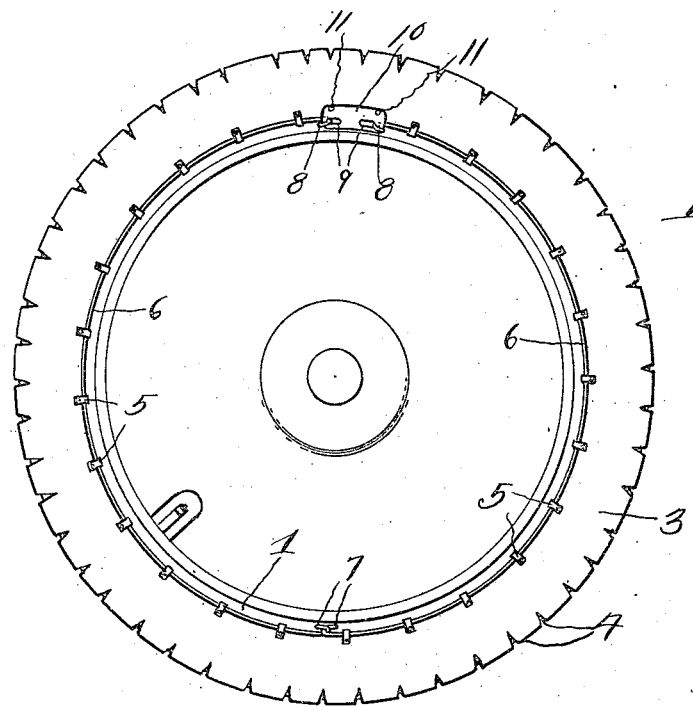
Figure 1 is a side elevation of a conventional form of pneumatic tire, showing the protector applied thereto.

The edges of the annular member 3 are provided with loops 5, through which loops segmentally shaped wires 6 extend, said wires having one of their ends provided with hooks 7, which are placed in engagement with each other as shown in Figure 1, before the inflating operation. The other ends of the segmentally shaped wires 6 are provided with hooks 8, which hook into apertures 9 of plates 10, which are secured by means of rivets 11 to the opposite sides of the annular member 3. It will be seen that the segmentally shaped wires 6 will limit the expansion of the annular member 3 and will cause the edges thereof to closely hug the sides of the tire casing 1, and will also insure the spreading of the slits 4 under the expansive action of the inflated tire.

From the above it will be seen that a tire protector is provided which is simple in construction, and one which may be formed from old tire casings. It will also be seen that antiskidding means is provided by the spreading of the slits 4, thereby obtaining the results obtained by an antiskid tread.

The invention having been set forth what is claimed as new and useful is:—

The combination with a pneumatic tire, of a tire protector therefor, said tire protector comprising an annular member segmentally shaped in transverse cross section and formed from resilient material, said annular member being provided with transversely disposed slits forming means whereby when the pneumatic tire is inflated transversely disposed openings are formed in the annular member.

In testimony whereof I hereunto affix my signature.

MICHAEL A. BOYLAN.